Nov. 12, 1968  S. C. SCHOONOVER  3,411,063
CONTROL CIRCUIT FOR A DIRECT CURRENT MOTOR
Filed Dec. 29, 1965  3 Sheets-Sheet 1

INVENTOR
Stanley C. Schoonover

BY DeLio and Montgomery
ATTORNEYS

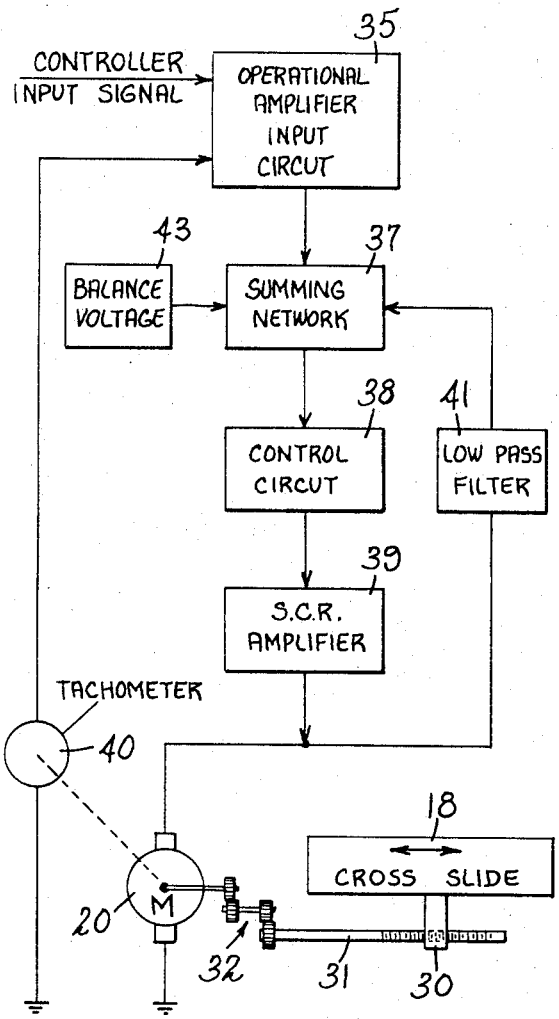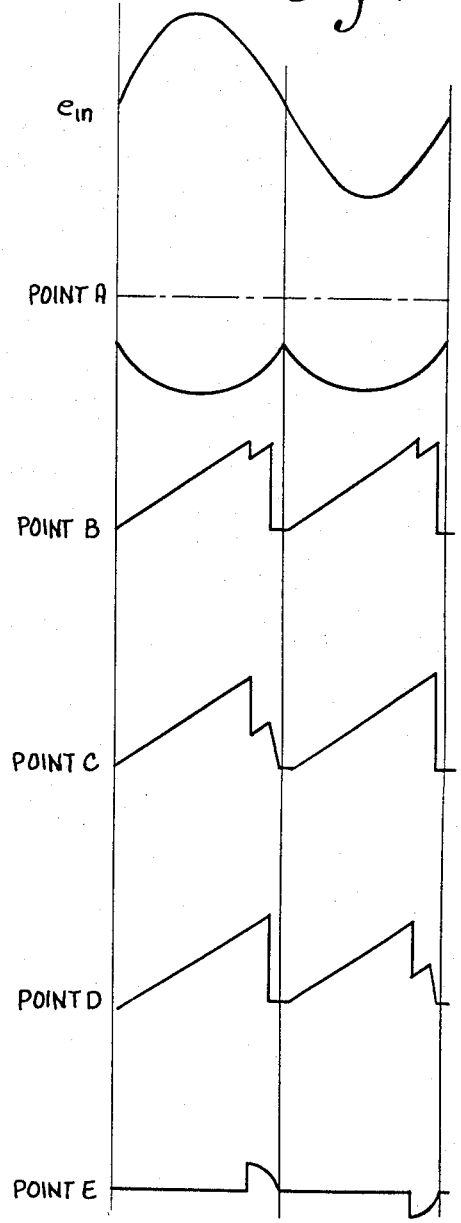

INVENTOR
Stanley C. Schoonover
BY
DeLio and Montgomery
ATTORNEYS

United States Patent Office 3,411,063
Patented Nov. 12, 1968

3,411,063
CONTROL CIRCUIT FOR A DIRECT
CURRENT MOTOR
Stanley C. Schoonover, Chester, Vt., assignor to Textron,
Inc., Providence, R.I., a corporation of Rhode Island
Filed Dec. 29, 1965, Ser. No. 517,320
10 Claims. (Cl. 318—331)

ABSTRACT OF THE DISCLOSURE

This invention is directed to a system for selectively controlling the amount of energy provided from an alternating current source to a DC motor. In particular, the invention is directed to the use of first and second oscillators whose frequencies of oscillation are controlled in accordance with an input control signal. Further, the invention provides synchronization signals derived from the alternating current source to control the operation of the oscillators.

---

This invention relates to a control system for machine tools and more particularly to a direct current motor control system suitable for energizing a direct current printed circuit motor.

For many years direct current motors have been utilized in machine tool applications. In the past, DC motors have been energized from AC lines by using thyratron or ignitron tubes which are arranged to provide a signal suitable for actuating the motor.

As the electronics industry developed, solid state devices such as controlled rectifiers (SCR), became available. The characteristics of the controlled rectifiers made them particularly suitable as replacements for thyratrons and ignitrons. The controlled rectifier is a solid state device much like the transistor, in that it has an anode, a cathode and a control element called a gate. A controlled rectifier conducts when the anode is sufficiently positive with respect to the cathode. Under normal operating conditions the anode voltage is not high enough to start conduction, but it is set sufficiently high to maintain current flow, once started. The gate of the rectifier performs much the same function as the grid of a thyratron, that is, when a small voltage is supplied to the gate, the rectifier fires (turns on) provided the correct anode to cathode voltage is also present.

Thereafter the gate has no control and cannot stop current flow. The only way to extinguish the rectifier is to remove or reduce the anode to cathode voltage below the holding point. When the current flow is stopped and the anode voltage restored, the gate is once again in a position to exercise control.

At the same time the electronics industry was developing, the electric motor industry, utilizing some of the techniques developed in the electronics industry, provided direct current motors having disc-type armatures. The disc-type armature was constructed with an uninsulated conductor pattern, utilizing printed circuit techniques. Additionally, the printed circuit motors utilized permanent magnets to provide the field. Printed circuit motors offer many advantages over conventional DC motors in servo drive applications since they tend to have low mechanical time constants and extremely low electrical time constants. Furthermore, they have large pulse torque capabilities providing accelerations equivalent to good hydraulic systems and are generally provided with permanent magnet fields, thus removing the necessity of providing separate field excitation circuits.

In order to combine the improved solid state controlled rectifiers with printed circuit motors, new and improved control circuitry was required. The control circuitry also must operate from a carrier frequency higher than the normal 60 cycle AC voltage generally utilized so as to match the motor's low mechanical time constant.

In view of the foregoing, it is an object of this invention to provide a new and improved motor control system.

Another object of the invention is to provide a new and improved system for controlling printed circuit direct current motors.

Another object of the invention is to provide a new and improved circuitry for initiating conduction of controlled rectifiers utilized to energize direct current printed circuit motors.

A further object of the invention is to provide a new and improved differentially controlled trigger circuit for controlling a direct current motor.

Still other objects and advantages of the invention will in part be obvious and will in part be apparent from the specification.

The invention accordingly comprises the features of construction, combination of elements and arrangements of parts which will be exemplified in the construction hereinafter set forth and the scope of the invention will be indicated in the claims.

For a fuller understanding of the nature and objects of the invention, reference should be had to the following detailed description, taken in connection with the accompanying drawings, in which:

FIG. 2 is a block diagram of the control system according to the invention;

FIG. 4 is a diagram illustrating the waveforms at various points in the circuitry of FIG. 3.

Figure 1:
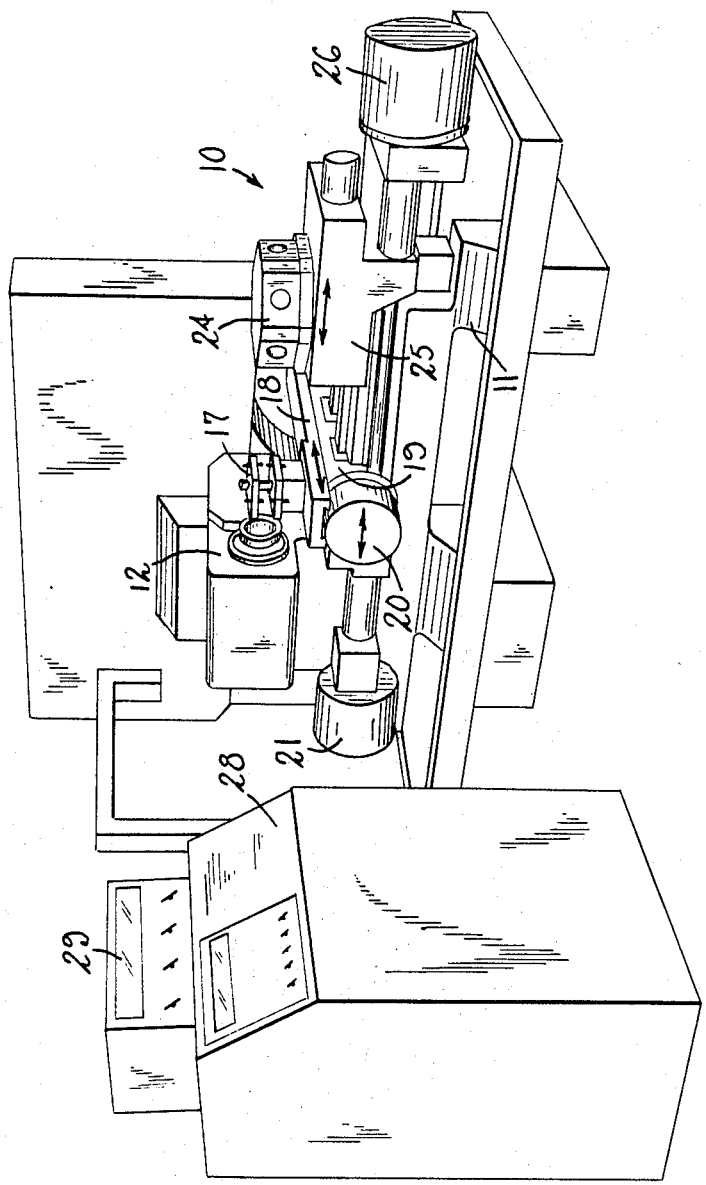
FIG. 1 is a diagrammatical illustration of a machine tool utilizing the invention.

Referring to FIG. 1, there is disclosed a machine tool such as a turret lathe, shown at 10. The lathe 10 includes a frame 11 having positioned thereon a head stock, spindle, and chuck arrangement 12 for holding and rotating a workpiece. Positioned adjacent the arrangement 12 is a square turret 17 supported on a cross slide 18 which, in turn, is supported on a carriage 19. The cross slide 18 is positioned in the Y direction by a motor 20 and the carriage 19 is positioned in the X direction by a motor 21. Positioned adjacent the square turret 17 is a hexagonal turret 24 mounted on a saddle 25 which is positioned in the U direction by a motor 26. In order to selectively energize the motors 20, 21 and 26, a controller 28 provides a signal to the servo system, generally shown at 29, to selectively actuate the motors in proper sequence to position the tool held by the turrets 17 and 26 with respect to the workpiece held by the arrangement shown at 12. In present day systems the controller generally operates from instructions coded on punched tape which is fed into and read by the controller. The turret lathe, operating on instructions from the tape produces parts automatically, using preset tools according to the tape instructions.

In FIG. 2 there is shown a motor control system for positioning the cross slide 18 or the carriage or saddle, as the case may be. Coupled to the cross slide 18 is a nut 30 which threadedly engages a lead screw 31 driven from a gear arrangement 32 by the motor 20. The controller input signal is provided to an operational amplifier input circuit 35 which, in turn, provides an input signal to a summing network 37. The signal is then fed to a control circuit 38 which selectively initiates conduction of silicon-controlled rectifiers of the silicon controlled amplifier 39. In this manner current is provided to the motor 20 to position the cross slide 18.

In order to regulate the operation of the system, two feedback networks or loops are provided, one of which networks comprises a tachometer 40 which provides a velocity feedback signal to the operational amplifier input circuit. The second feedback loop comprises a lowpass filter 41 coupled to the motor 20 to compensate for the non-linearity of the SCR amplifier. Since the lowpass filter 41 creates a large-phase lead in the overall system, a phase lag of the same magnitude must be inserted in the system. To accomplish this, the operational amplifier input circuit includes a resistive capacitive phase lag network to create a flat overall frequency response in the control system servo loop. Additionally, to insure zero voltage output for zero voltage input, a balancing adjustment voltage 43 is coupled to the summing network 37.

Figure 3:
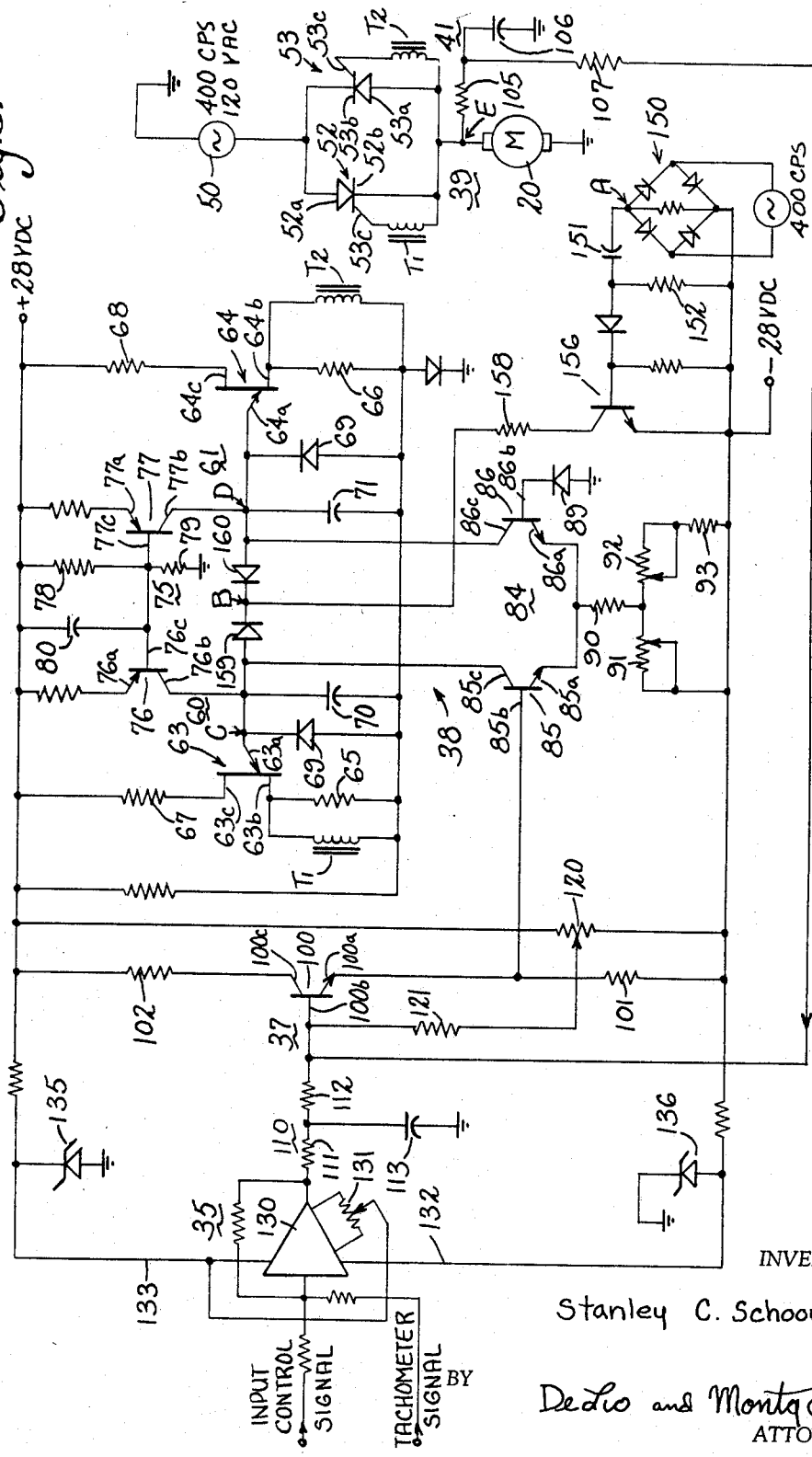
FIG. 3 is a schematic diagram of the circuitry according to the invention.

Referring now to FIG. 3, there is disclosed a diagram of a circuit for implementing the block diagram of FIG. 2. The motor 20, which is preferably a printed circuit motor having its field excitation provided by permanent magnets, is coupled in series with the silicon-controlled amplifier 39 and an alternating current source such as a 400 cycle per second source shown at 50. The silicon-controlled amplifier 39 comprises first and second controllable rectifiers, SCR's 52 and 53, respectively. These rectifiers have anodes 52a and 53a, cathodes 52b and 53b and gates 52c and 53c, respectively. The rectifiers 52 and 53 are coupled in a back-to-back relationship, such that both positive and negative portions of the alternating frequency signal from the source 50 will be applied to the DC motor 20. The direction of rotation of the motor shaft will be determined by the average value of the DC current flowing through the motor.

In order to control the extent of the negative and positive portion of the AC voltage applied to the DC motor, a control circuit 38 is provided. The circuit 38 selectively triggers the control rectifiers 52 and 53 to vary the time during the alternating cycle that the positive and negative portions of the cycle are permitted to be applied across the motor 20. Triggering pulses are coupled from the control circuit 38 by way of pulse transformers $T_1$ and $T_2$ respectively. The secondaries of transformers $T_1$ and $T_2$ are coupled to controlled rectifiers 52 and 53, respectively.

To generate the trigger pulses to initiate conduction of the controlled rectifiers 52 and 53, there are provided two relaxation oscillator circuits, shown at 60 and 61. These circuits comprise two unijunction transistors 63 and 64, respectively. The unijunction transistors have emitters 63a and 64a, base ones 63b and 64b, and base twos 63c and 64c, respectively. The primaries of the pulse transformers $T_1$ and $T_2$ are connected to bases 63b and 64b of transistors 63 and 64, respectively. A resistor 65 is connected across the primary of transformer $T_1$ and resistor 66 is connected across the primary of transformer $T_2$ to shape the output trigger pulse provided from these transformers. The bases 63c and 64c are coupled through resistors 67 and 68, respectively, to a source of positive bias voltage. Protective diodes 69 are coupled across the emitters 63a and 64a of the transistors 63 and 64, to insure that the emitters will not become negative with respect to the bases. There is connected to each of the emitters 63a and 64a capacitors 70 and 71, respectively, which are connected between the emitters and ground such that when they charge to a predetermined voltage and unijunction transistor will conduct and the capacitor 70 or 71, as the case may be, will discharge through the transistor to cause a pulse to be generated by the transformer $T_1$ and $T_2$. The rate of charge and discharge of the capacitors 70 and 71, respectively, determines the oscillation frequency of the relaxation oscillators. The unijunction transistors 63 and 64 will cease conducting when the capacitors 70 and 71 have discharged to a predetermined voltage such that the emitter is no longer forward biased.

There is provided at 75 a substantially constant current source including two transistors 76 and 77 which comprise emitters 76a and 77a, selectors 76b and 77b and bases 76c and 77c. The transistors 76 and 77 are both biased at a fixed voltage independent of the collector voltage by resistors 78 and 79. Thus a constant charging current will be provided to capacitors 70 and 71 and the current will be equal in both capacitors, such that the relaxation oscillator frequencies will normally be equal. In this manner the motor shaft will remain stationary inasmuch as the average DC power provided to the motor is equal to zero. A lowpass filtering capacitor 80 is provided across resistor 78 to insure that the current flowing in transistors 76 and 77 has a low ripple content.

To alter the relaxation oscillation frequency of the oscillators 60 and 61, there is provided a differential amplifier 84 for altering the rate at which the capacitors 70 and 71 charge to the voltage to cause the unijunction transistors 63 and 64, respectively, to conduct. The differential amplifier comprises two transistors 85 and 86 which comprise emitters 85a and 86a, bases 85b and 86b, and collectors 85c and 86c. The collectors 85c and 86c are coupled to the junction point between capacitor 70 and collector 76b, and capacitor 71 and collector 77b, respectively. The base 86b is kept at a reference potential by its connection through a diode 89 to ground. The emitters 85a and 86a are coupled in parallel through a variable resistance trimpot connection comprising resistor 90 and two variable resistors 91 and 92 and a fixed resistor 93. The resistances are varied to set the current flowing through the differential amplifer. The base 85b forms the input terminal of the differential amplifier 84. Normally the differential amplifer 84 is set such that the frequencies of the two relaxation oscillators 60 and 61 are equal. By applying a positive potential to base 85b, transistor 85 will conduct more than transistor 86, thereby drawing more of the current away from capacitor 70, such that the frequency of oscillation of transistor 60 will decrease. Simultaneously, transistor 86 will conduct less and, therefore, will draw less current from capacitor 71 such that the frequency of oscillation of relaxation oscillator 61 will increase.

By applying a negative signal from the controller to position the slide 18 in the opposite direction, the oscillation frequency of the oscillator 63 will increase while the oscillation frequency of oscillator 64 will decrease. Thus, to change the direction of rotation of the shaft of the motor 20, a voltage of a different polarity is applied to base 85b of transistor 85.

In FIG. 3 there is shown the summing network 37 in the form of an emitter follower transistor circuit for driving the differential amplifier 84. The emitter follower comprises a transistor 100 having an emitter 100a, a base 100b and a collector 100c. The emitter follower load resistor is shown at 101 and a current limiting resistor 102 is connected between collector 100c and the supply voltage. Connected to base 100b and transistor 100 is a lowpass filter 41, which is coupled to the armature of the motor 20 so as to provide a low impedance velocity error signal to the summing circuit 37. The filter 41 comprises a resistor 105, capacitor 106 and resistor 107. Also coupled to the base 100b of the summing circuit 37 is the operational amplifier input circuit 35. The circuit 35 provides an input velocity signal to the summing circuit 37 in order to drive motor 20. The operational amplifier circuit 35 includes a lowpass filter generally shown at 110 and comprises a resistor 111, resistor 112 and capacitor 113. The filter 110 is provided to create a phase lag of the same magnitude as the phase lead resulting from lowpass filter 41, so as to create a flat overall frequency response for the control system.

Additionally, a balance adjustment comprising a variable resistor 120 is coupled to the DC voltage source and to base 100b through a fixed resistor 121. The variable resistor 120 assures zero output voltage from the emitter follower 100 for zero voltage input to the base 100b. The operational amplifier portion of the circuit 35 is shown at 130. An operational amplifier suitable for use herein may be purchased from The Nexus Research Laboratory Inc. of Canton, Massachusetts. The operational amplifier comprises the zero balancing control circuit shown at 131 and input power connections 132 and 133. Negative and positive voltages are applied to the amplifier from the + and — DC voltages shown in the diagram. The voltages are clamped by way of Zener diodes 135 and 136, respectively. The input position error signal as generated by the controller unit is a bi-polarized DC signal, that is, plus or minus. This signal represents the command velocity and is mixed with a feedback velocity signal obtained from the tachometer 40 and is then applied to the operational amplifier 130. This signal is then amplified by amplifier 130, then applied through filter 110 to the summing circuit 37.

In order to synchronize the operation of the unijunction transistor relaxation oscillators 60 and 61 with the frequency of the supply voltage provided to the SCR's 52 and 53 respectively, a lower value voltage of the same phase and the same frequency as the supply voltage is full-wave rectified by a bridge circuit shown at 150. The signal is then differentiated by capacitor 151 and resistor 152 and subsequently amplified by transistor 156. The amplified signal is then coupled to the unijunction transistor emitters 63a and 64a through a resistor 158 and diodes 159 and 160, respectively.

In operation, the sync circuit provides a ramp voltage to the unijunction transistors which is added to the signal provided from the constant current source 75 and the differential amplifier 84. As a result of the ramp voltage, a low impedance path to —28 volts is provided at the end of each half cycle of the 400 cycle source signal. It is to be understood that the oscillation frequency of the oscillators 60 and 61 may be varied if desired, but they are preferably operated at frequencies of between .4 kc. to 8 kc.

To illustrate the input source and output signal waveforms along with other signal waveforms at various points in the circuit of FIG. 3, reference should simultaneously be had to FIG. 4 and to points A–E in FIG. 3. The first waveform shown in FIG. 4 represents the input signal ($e_{in}$) from source 50 and the second waveform at point A shows ($e_{in}$) after it has been halfwave rectified by rectifier 150.

The waveforms at point B illustrate the ramp voltage provided from the sync circuit transistor 156 and the waveforms at points C and D represent the ramp voltages at the emitters 63a and 64a as modified by the turning on and off of the oscillator transistors 63 and 64 respectively. The last waveform at point $e$ represents the output signal voltage applied to the motor 20.

While it will be understood that the circuit specifications may vary according to the design for any particular application, the following circuit specifications are included for the circuit of FIG. 3, by way of example only:

| | |
|---|---|
| Motor 20 | Model 1028—Printed Circuit Motor, Inc. Glen Cove, N.Y. |
| Transistors 63, 64 | 2N2647. |
| Resistors 65, 66 | 100 ohms. |
| Resistors 67, 68 | 150 ohms. |
| Capacitors 70, 71 | .05 mfd. |
| Transistors 76, 77 | 2N1118. |
| Resistor 78 | 3300 ohms. |
| Resistor 79 | 12000 ohms. |
| Transistors 85, 86 | 2N698. |
| Transistor 156 | 2N698. |
| Resistor 158 | 820 ohms. |
| Transformers $T_1$, $T_2$ | PE2231. |
| Operational amplifier | Nexus SL–6. |
| All diodes | 1N663. |

This completes the description of the preferred embodiment of the invention. It is to be understood that other circuit elements may be substituted for those mentioned above, without departing from the spirit of the invention.

It will thus be seen that the objects set forth above, among those made apparent from the preceding description, are efficiently attained and since certain changes may be made in the above construction without departing from the spirit and scope of the invention, it is intended that all matter contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to a fall therebetween.

What is claimed is:

1. A control system suitable for selectively controlling the amount of energy provided from an alternating current source to a DC motor armature, the system comprising a pair of semiconductor devices, each having an odd number of PN junctions and input and output terminals, said input and output terminals of each device adapted to be connected in series with the source and the motor armature, and said devices connected to the motor armature and the source such that both positive and negative portions of the alternating current cycle may be provided to the motor armature during each cycle of alternating current, a first oscillator coupled to the control terminal of one of the devices and a second oscillator coupled to the control terminal of the other of the devices, said oscillators providing signals to control the time at which the negative and positive portions of the alternating current signal are provided to the motor armature during each cycle of alternating current, and first means responsive to an input control signal and coupled to said oscillators to determine the time in each alternating current cycle at which each oscillator will conduct to control the direction of rotation of said motor armature.

2. A system in accordance with claim 1, wherein each of said oscillators comprises a unijunction transistor, said transistor having an emitter and input and output terminals, a substantially constant current source coupled to the emitter and a capacitor coupled to the emitter, and wherein said first means comprises a differential amplifier for varying the rate that current is stored in each of the capacitors of each oscillator during each alternating current cycle, said amplifier coupled to the capacitor of each oscillator and said amplifier responsive to an input signal provided to vary the oscillation frequency of the oscillator.

3. A system in accordance with claim 10, wherein said amplifier is a differential amplifier comprising two transistors having input and output and control terminals, and wherein the output terminal of one of said transistors is coupled to the capacitor connected to one of the oscillators, and the output terminal of the other transistor is coupled to the capacitor connected to the other of said oscillators.

4. A system in accordance with claim 3, wherein a summing circuit is coupled to one of the control terminals of one of said differential amplifiers, and wherein a lowpass filter is coupled to the summing circuit in order to derive a signal indicative of the motor armature voltage, and means for providing a command signal to said summing circuit.

5. A system in accordance with claim 4, including a phase lead network coupled to the summing circuit and an operational amplifier coupled to the summing circuit, means for providing a velocity feedback signal from said motor to said operational amplifier, and a position error signal to said operational amplifier to provide the command signal.

6. A system in accordance with claim 5, including a balance voltage means for providing a signal to the summing circuit to insure that at zero command signal the average DC voltage across the motor is equal to zero.

7. A system in accordance with claim 1, wherein the semiconductor devices are coupled in parallel and wherein the emitter of one device is coupled to the collector of the other device.

8. A system in accordance with claim 1, wherein the motor is a printed circuit motor having a rotor with a conductive pattern thereon and a permanent magnet for providing the motor field.

9. A control system suitable for selectively controlling the amount of energy provided from an alternating current source to a DC motor, the system comprising a pair of semiconductor devices, each having an odd number of PN junctions and input and output terminals, said terminals of each device adapted to be connected in series with the source and the motor, and said devices connected to the motor and the source such that both positive and negative portions of the alternating current cycle may be provided to the motor, a first oscillator coupled to the control terminal of one of the devices and a second oscillator coupled to the control terminal of the other of said devices, said oscillators providing signals to control the time at which the negative and positive portions of the alternating current signals are provided to the motor, means for varying the oscillation frequency of said oscillators in accordance with an input control signal, and including means for providing a synchronization signal to each of said oscillators, said synchronization signal derived from the voltage of the same phase as the voltage provided by the alternating current source.

10. A control system suitable for selectively controlling the amount of energy provided from an alternating current source to a DC motor, the system comprising a pair of semiconductor devices, each having an odd number of PN junctions and input and output terminals, said input and output terminals of each device adapted to be connected in series with the source of the motor, and said devices connected to the motor and the source such that both the positive and negative portions of the alternating current cycle may be provided to the motor, a first oscillator coupled to the control terminal of one of the devices and a second oscillator coupled to the control terminal of the other of said devices, said oscillators providing signals to control the time at which the negative and positive portions of the alternating current signals are provided to the motor, means for varying the oscillation frequency of said oscillator in accordance with an input control signal, each of said oscillators comprising a unijunction transistor, said transistor having an emitter and input and output terminals, a substantially constant current source coupled to the emitter and a capacitor coupled to the emitter, said means for varying the oscillation frequency of said oscillators comprising an amplifier varying the rate that current is stored in the capacitor, an amplifier coupled to the capacitor and said amplifier responsive to an input signal provided to vary the oscillation frequency of the oscillator, and including means for providing a synchronization signal to said capacitor, said signal derived from an alternating current source of the same phase as provided from the AC source.

References Cited

UNITED STATES PATENTS

| | | | |
|---|---|---|---|
| 2,977,523 | 3/1961 | Cockrell | 318—345 X |
| 3,280,353 | 10/1966 | Haydon et al. | 310—268 X |
| 3,283,234 | 11/1966 | Dinger | 318—345 X |

ORIS L. RADER, *Primary Examiner.*

J. J. BAKER, *Assistant Examiner.*